(12) United States Patent
Nomoto (10) Patent No.: US 9,664,987 B2
(45) Date of Patent: May 30, 2017

(54) IMAGE DISPLAY APPARATUS (71) Applicant: CANON KABUSHIKI KAISHA, Tokyo (JP)

(72) Inventor: Makoto Nomoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 14/942,854

(22) Filed: Nov. 16, 2015

(65) Prior Publication Data

US 2016/0142688 A1  May 19, 2016

(30) Foreign Application Priority Data

Nov. 18, 2014 (JP) .................................. 2014-233510
Oct. 30, 2015 (JP) .................................. 2015-215040

(51) Int. Cl.
 *G03B 21/16* (2006.01)
 *H04N 9/31* (2006.01)
 *G02B 27/00* (2006.01)

(52) U.S. Cl.
 CPC ......... *G03B 21/16* (2013.01); *G02B 27/0006* (2013.01); *H04N 9/3108* (2013.01); *H04N 9/3144* (2013.01); *H04N 9/3158* (2013.01)

(58) Field of Classification Search
 CPC .............................. H04N 9/3144; G03B 21/16
 See application file for complete search history.

(56) References Cited

U.S. PATENT DOCUMENTS

| 7,993,009 | B2* | 8/2011 | Tsuchiya | G02F 1/133385 165/104.11 |
| 8,240,166 | B2* | 8/2012 | Nishijima | G03B 21/16 62/259.2 |
| 8,794,767 | B2* | 8/2014 | Yanagisawa | F25B 21/02 353/54 |
| 9,128,361 | B2* | 9/2015 | Yanagisawa | F25B 21/02 |
| 2006/0139577 | A1 | 6/2006 | Ikeda | |
| 2008/0055563 | A1* | 3/2008 | Momose | G03B 21/16 353/61 |
| 2008/0225188 | A1* | 9/2008 | Hoshino | G02F 1/133385 349/8 |
| 2008/0236190 | A1* | 10/2008 | Tsuchiya | G03B 21/16 62/468 |

(Continued)

FOREIGN PATENT DOCUMENTS

JP  2005114997 A  4/2005
JP  2006047914 A  2/2006

(Continued)

*Primary Examiner* — Bao-Luan Le
(74) *Attorney, Agent, or Firm* — Canon U.S.A., Inc., IP Division (57) ABSTRACT

An image display apparatus includes a light source, a light valve, at least one light guide optical system of a first light guide optical system or a second light guide optical system, a first cooling unit configured to cool at least one of the light source, the light valve, the first light guide optical system, or the second light guide optical system, an inlet port, a second cooling unit configured to cool at least one of the light source, the light valve, the first light guide optical system, or the second light guide optical system, and a filter disposed in an air path from the inlet port to a member to be blown by an air blowing fan. A radiator is disposed between the inlet port and the filter.

11 Claims, 11 Drawing Sheets

(56) References Cited

U.S. PATENT DOCUMENTS

| | | | | |
|---|---|---|---|---|
| 2008/0236191 A1* | 10/2008 | Tsuchiya | ................ | G03B 21/16 |
| | | | | 62/498 |
| 2009/0237619 A1* | 9/2009 | Yanagisawa | ............ | F25B 21/02 |
| | | | | 353/54 |
| 2009/0266098 A1* | 10/2009 | Nishijima | ............... | G03B 21/16 |
| | | | | 62/259.2 |
| 2010/0066980 A1* | 3/2010 | Tsuchiya | ........... | G02F 1/133385 |
| | | | | 353/56 |
| 2010/0302463 A1* | 12/2010 | Matsumoto | ............ | G03B 21/16 |
| | | | | 348/744 |
| 2011/0019160 A1* | 1/2011 | Kitano | ................... | G03B 21/16 |
| | | | | 353/57 |
| 2011/0032489 A1* | 2/2011 | Kimoto | ................. | G03B 21/16 |
| | | | | 353/56 |
| 2014/0300871 A1* | 10/2014 | Yanagisawa | ............ | F25B 21/02 |
| | | | | 353/54 |

FOREIGN PATENT DOCUMENTS

| | | |
|---|---|---|
| JP | 2008176079 A | 7/2008 |
| JP | 4251114 B2 | 4/2009 |
| JP | 2010176054 A | 8/2010 |

* cited by examiner

IMAGE DISPLAY APPARATUS

BACKGROUND OF THE INVENTION

Field of the Invention

The present invention relates to an image display apparatus, and more particularly relates to cooling and dust removing structures.

Description of the Related Art

In accordance with enhanced resolution and brightness, a projector (i.e., an image display apparatus) including a projection optical system has been conventionally required to have higher cooling performance and to prevent dust adhesion. Such a projector has therefore employed a configuration of cooling a heat source (e.g., a light valve) disposed in an enclosed structure, using a liquid cooling technique.

More specifically, Japanese Patent Application Laid-Open No. 2008-176079 discusses a configuration of cooling a plurality of heat sources disposed in an enclosed space, using a liquid cooling technique. Japanese Patent Application Laid-Open No. 2005-114997 discusses a configuration of cooling, using a liquid cooling technique, a heat source disposed in an enclosed space so as to prevent dust adhesion.

Nevertheless, the respective configurations discussed in Japanese Patent Application Laid-Open No. 2008-176079 and Japanese Patent Application Laid-Open No. 2005-114997 can only cool the small number of heat sources such as light valves in the enclosed space, and it has been difficult to achieve both cooling and dust adhesion prevention for other optical elements.

SUMMARY OF THE INVENTION

The present invention is directed to an image display apparatus that can effectively cool optical elements including light valves and prevent dust adhesion to the optical elements.

According to an aspect of the present invention, an image display apparatus includes a light source, a light valve, at least one light guide optical system of a first light guide optical system configured to guide a light beam from the light source to the light valve or a second light guide optical system configured to guide a light beam from the light valve to a projection surface, a pump configured to circulate a coolant inside a tube, a radiator configured to radiate heat from at least one of the light source, the light valve, the first light guide optical system, or the second light guide optical system through the coolant, a first cooling unit configured to cool at least one of the light source, the light valve, the first light guide optical system, or the second light guide optical system, an inlet port, a second cooling unit including an air blowing fan and configured to cool at least one of the light source, the light valve, the first light guide optical system, or the second light guide optical system with air taken in through the inlet port, and a filter disposed in an air path from the inlet port to a member to be blown by the air blowing fan. The radiator is disposed between the inlet port and the filter.

Further features of the present invention will become apparent from the following description of exemplary embodiments with reference to the attached drawings.

DESCRIPTION OF THE EMBODIMENTS

Exemplary embodiments of the present invention will be described in detail below based on the attached drawings.

Image Display Apparatus

Figure 1:
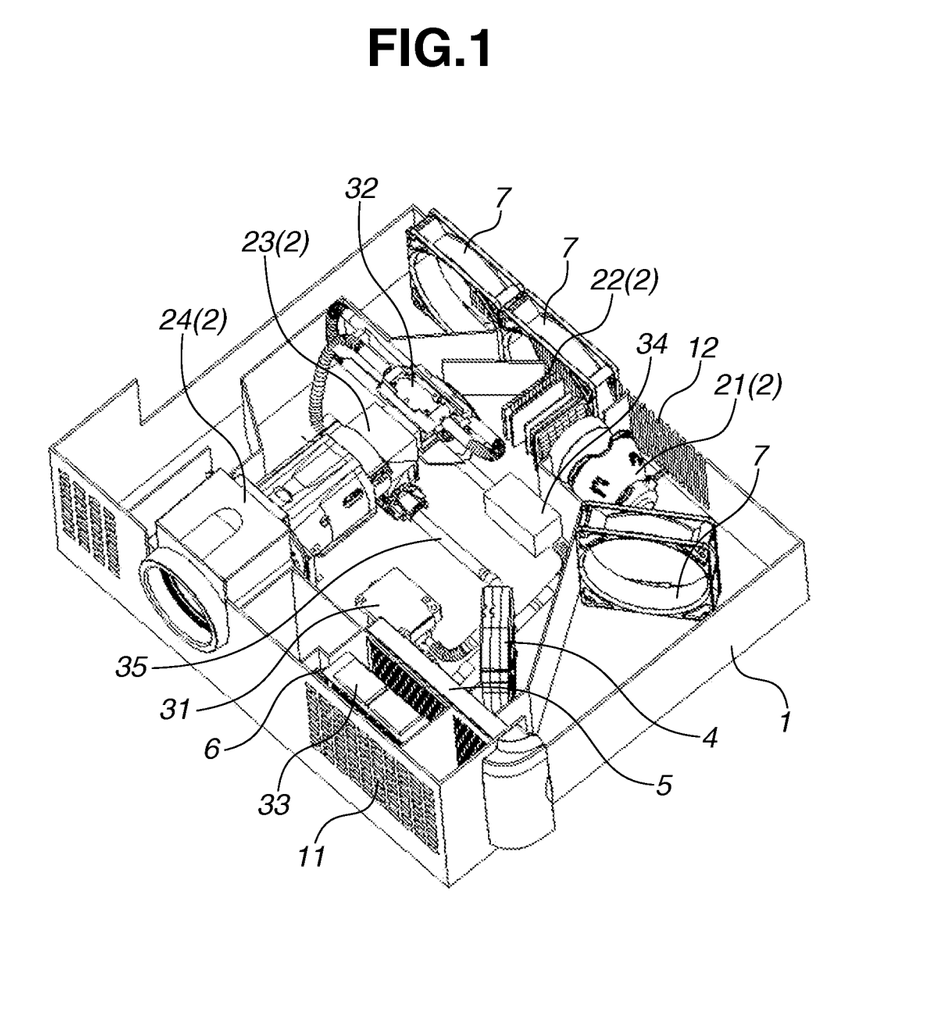
FIG. 1 is an overall configuration view illustrating an image display apparatus according to a first exemplary embodiment of the present invention.

FIG. 1 illustrates an overall configuration of an image display apparatus according to a first exemplary embodiment of the present invention. The image display apparatus includes an optical structure, a cooling structure, and a dust removing structure described below. In the present exemplary embodiment, a radiator in the cooling structure is disposed at a position suitable even for the dust removing structure. First of all, the optical structure will be described.

1) Optical Structure

Figure 6:
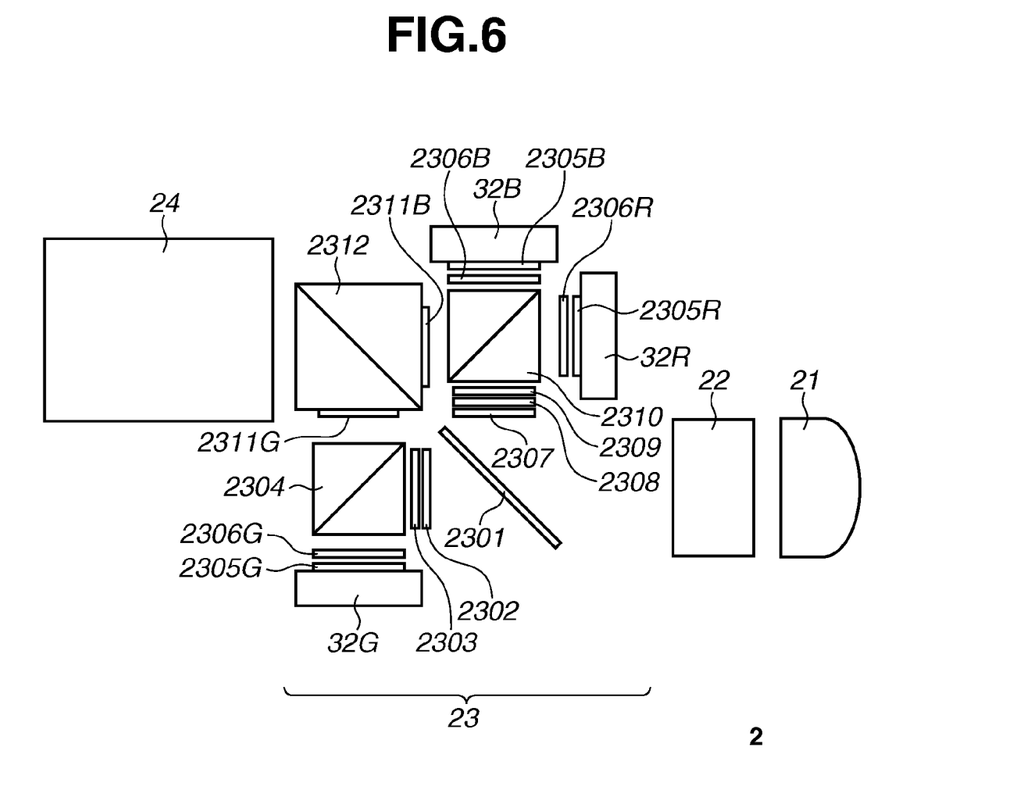
FIG. 6 is a detail view illustrating an optical system of the image display apparatus according to an exemplary embodiment of the present invention.

FIG. 6 is a schematic view illustrating the optical structure of a projector serving as the image display apparatus according to the exemplary embodiment of the present invention. In FIG. 6, an optical system 2 includes an illumination optical system 22, a color separating/combining system 23, and a projection lens (projection optical system) 24. The illumination optical system 22 illuminates light valves 2305 described below, with light from a light source 21 that emits light. The color separating/combining system 23 includes a color separating optical system that guides light from the illumination optical system 22 to the light valves 2305 (2305R, 2305G, and 2305B) formed of liquid crystal and the like. The color separating/combining system 23 further includes a color combining optical system that combines light beams from the light valves 2305, and guides the combined light beam to the projection lens 24. The projection lens 24 guides the light beam from the color separating/combining system 23 to a projection surface.

In each exemplary embodiment of the present invention, the illumination optical system 22 and the color separating optical system (a section of the color separating/combining system 23 excluding the color combining optical system) are collectively referred to as a first light guide optical system.

In other words, an optical system that guides light from the light source 21 to the light valves 2305 is regarded as the first light guide optical system. In each exemplary embodiment of the present invention, the color combining optical system (a section of the color separating/combining system 23 excluding the color separating optical system) and the projection lens 24 serving as the projection optical system are referred to as a second light guide optical system.

The light source 21 is a high intensity light source, such as a high-pressure mercury lamp. The light source 21 includes a light emission tube that emits white light with a continuous spectrum, and a reflector that condenses light in a predetermined direction. The light source 21 emits light to the illumination optical system 22 at the subsequent stage. The illumination optical system 22 includes a glass member such as a cylinder array and a fly-eye lens. An optical effect of the glass member forms a uniform rectangular illumination area in which rectangular images corresponding to a plurality of light beams overlap with each other. The light valves 2305 at the subsequent stage is thereby illuminated.

The color separating/combining system 23 includes a dichroic mirror 2301 that reflects light in wavelength ranges of blue (B) and red (R), and transmits light in a wavelength range of green (G). The color separating/combining system 23 further includes, for light in a wavelength range of green (G), a half-wave plate 2302, an incident side polarizer 2303, and a first polarization beam splitter 2304. The incident side polarizer 2303 for green is obtained by attaching a polarization element on a transparent substrate that only transmits S-polarized light. The first polarization beam splitter 2304 has a polarization splitting surface, transmits P-polarized light, and reflects S-polarized light.

Having been reflected by the first polarization beam splitter 2304 serving as a prism at which an optical path is branched, the S-polarized light is circularly polarized through a quarter-wave plate 2306G for green. The light is thereby oriented toward the light valve 2305G for green placed on a heat sink 32G. The quarter-wave plate 2306G is disposed on an optical path between the first polarization beam splitter 2304 and the light valve 2305G for green.

The light reflected by the light valve 2305G for green is P-polarized through the quarter-wave plate 2306G for green. Then, the P-polarized light is transmitted through the first polarization beam splitter 2304 and an exit side polarizer 2311G for green that only transmits P-polarized light, to be orientated toward a dichroic prism 2312 that transmits red light and blue light and reflects green light.

For the red light and the blue light reflected by the dichroic mirror 2301, an incident side polarizer 2307 for red and blue that only transmits P-polarized light and is obtained by attaching a polarization element on a transparent substrate, and a color-selective phase plate 2308 are provided. The color-selective phase plate 2308 has a function of shifting a polarization direction of red light by 90° without shifting the polarization direction of blue light. Thus, when being transmitted through the color-selective phase plate 2308, the light in the wavelength range of red is converted into S-polarized light while light in the wavelength range of blue remains to be P-polarized light. A trimming filter 2309 for returning orange light to the lamp is disposed in an optical path following the color-selective phase plate 2308 to achieve higher color purity of the color red.

A second polarization beam splitter 2310 serves as a prism that transmits P-polarized light, reflects S-polarized light, and branches or combines the optical path(s). The second polarization beam splitter 2310 reflects red light as S-polarized light, whereas it transmits blue light as P-polarized light. Having been reflected by the second polarization beam splitter 2310, the red right is circularly polarized through a quarter-wave plate 2306R for red. The light is thereby oriented toward the light valve 2305R for red placed on a heat sink 32R. The light reflected by the light valve 2305R for red is P-polarized through the quarter-wave plate 2306R for red.

Then, the light enters the projection lens 24 serving as the projection optical system after being transmitted through the second polarization beam splitter 2310, an exit side polarizer (polarization element) 2311B for blue that only rectifies blue S-polarized light, and the dichroic prism 2312.

On the other hand, the blue light having been transmitted through the second polarization beam splitter 2310 is circularly polarized through a quarter-wave plate 2306B for blue. The light is thereby oriented toward the light valve 2305B for blue placed on a heat sink 32B. Having been reflected by the light valve 2305B for blue, the light is P-polarized through the quarter-wave plate 2306B for blue. Then, the light is reflected by the second polarization beam splitter 2310 to enter the projection lens 24 serving as the projection optical system after being transmitted through the exit side polarizer (polarization element) 2311B for blue that only rectifies blue S-polarized light, and the dichroic prism 2312.

Being reflective liquid-crystal display elements, the light valve 2305R for red, the light valve 2305G for green, and the light valve 2305B for blue reflect entered light, and also perform image modulation. Then, by using the color separating/combining system 23 described above, images on the light valves 2305 are projected on a projection surface (screen surface) as a color image by the projection lens 24. The dichroic prism 2312, the exit side polarizer 2311B for blue, and the exit side polarizer 2311G for green of the color separating/combining system 23 described above are regarded as the color combining optical system. The other optical elements of the color separating/combining system 23 are regarded as the color separating optical system.

2) Cooling Structure

An image display apparatus according to the present exemplary embodiment includes, inside a casing 1 as an apparatus main body, a liquid cooling unit 3 (see FIGS. 3 and 4) serving as a first cooling unit that cools the light valves 2305, and a second cooling unit (see FIG. 2) that cools the optical system 2 including the light valves 2305 by blowing air.

2-1) First Cooling Unit

Figure 4:
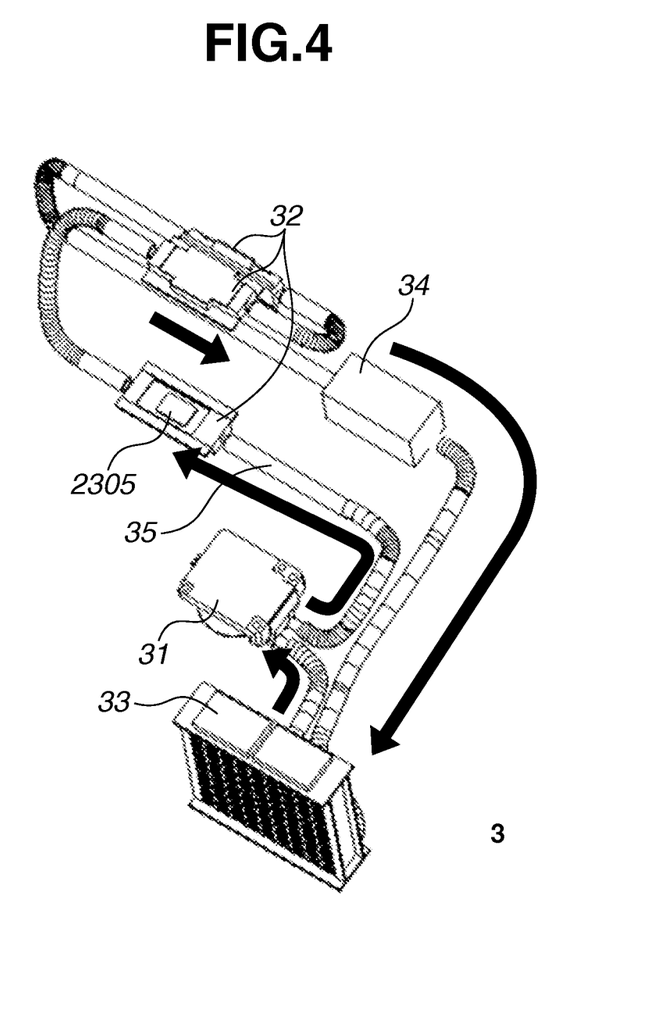
FIG. 4 is a detail view illustrating a liquid cooling system of the first cooling unit according to an exemplary embodiment of the present invention.

The light valve 2305 generates heat according to an amount of heat absorbed when the light is reflected and an amount of heat self-consumed when the image modulation is performed, and thus is cooled by the liquid cooling unit 3 serving as the first cooling unit. As illustrated in FIG. 4, the liquid cooling unit 3 includes a tube 35 connecting between the components, a coolant (not illustrated) that flows in the tube 35, and a pump 31 that circulates the coolant. The liquid cooling unit 3 further includes a heat receiving jacket 32 serving as a heat receiving unit, a radiator 33 serving as a heat radiating unit, and a tank 34 that stores the coolant and also includes an air layer.

In the liquid cooling unit 3, the heat receiving jacket 32 receives heat from the light valves 2305 disposed in the color separating/combining system 23, the pump 31 transfers the heat to the radiator 33 through the coolant, and the radiator 33 radiates the heat through outside air from an inlet port 11.

Figure 5:
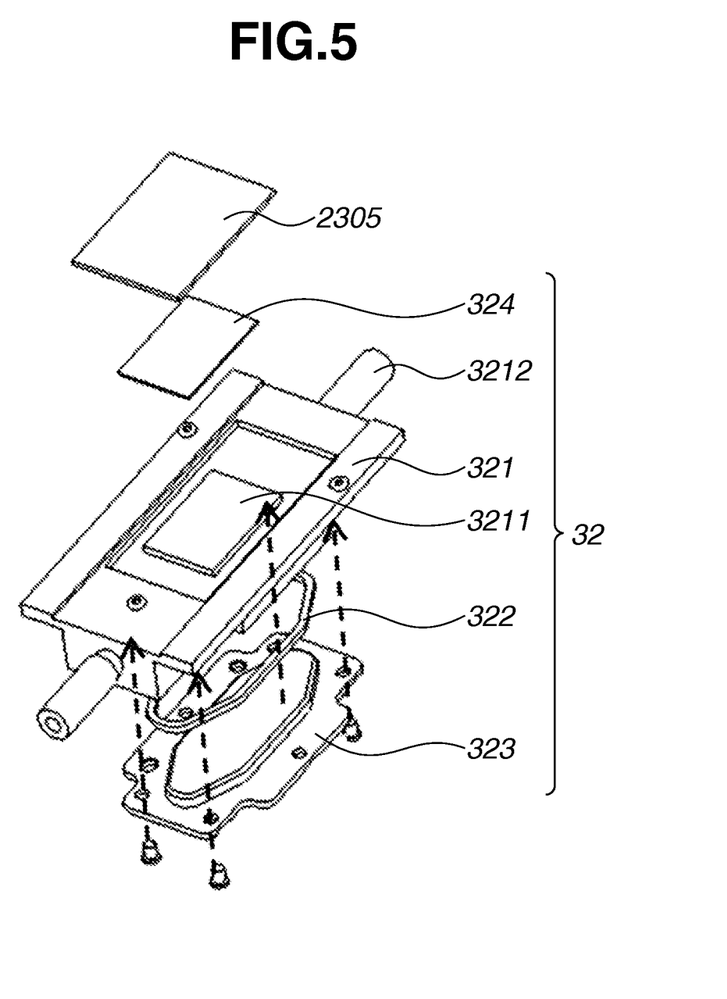
FIG. 5 is a detail view illustrating a heat receiving jacket of the liquid cooling system of the first cooling unit according to an exemplary embodiment of the present invention.

A configuration of the heat receiving jacket 32 of the liquid cooling unit 3 will be described in detail with reference to FIG. 5. The heat receiving jacket 32 is in contact with the light valve 2305 via a thermally conductive sheet 324. As a specific configuration, the heat receiving jacket 32 includes a contact portion 3211 to be in contact with the thermally conductive sheet 324. A jacket cover 323 is fixed to a jacket base 321 having a fin shape and a hollow groove, with a liquid leakage preventing rubber 322 being sandwiched therebetween, whereby the heat receiving jacket 32 having a hollow structure is obtained.

The jacket base 321 is provided with a joint portion 3212 to which the tube 35 is attached to establish piping. The heat generated by the light valve 2305 is thermally conducted to the jacket base 321 through the thermally conductive sheet 324, and is transferred to the coolant flowing in the hollow space in the heat receiving jacket 32 due to the fin shape of the jacket base 321. The coolant flowing in the heat receiving jacket 32 flows into the tube 35 connected to the heat receiving jacket 32, so that the heat is radiated by the radiator 33. Although the thermally conductive sheet 324 is used in the present exemplary embodiment, other thermally conductive members such as thermally conductive grease may be used.

2-2) Second Cooling Unit

Figure 2:
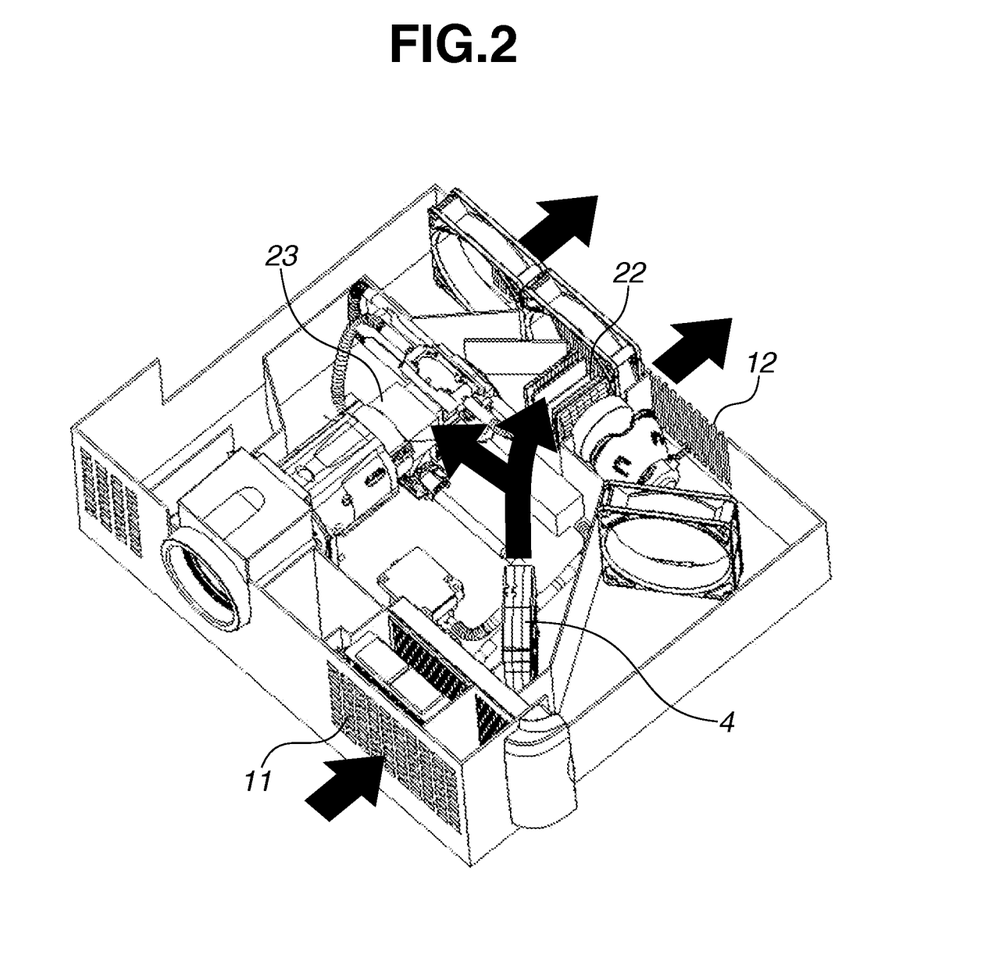
FIG. 2 is a view illustrating a cooling structure of a second cooling unit according to an exemplary embodiment of the present invention.
Figure 3:
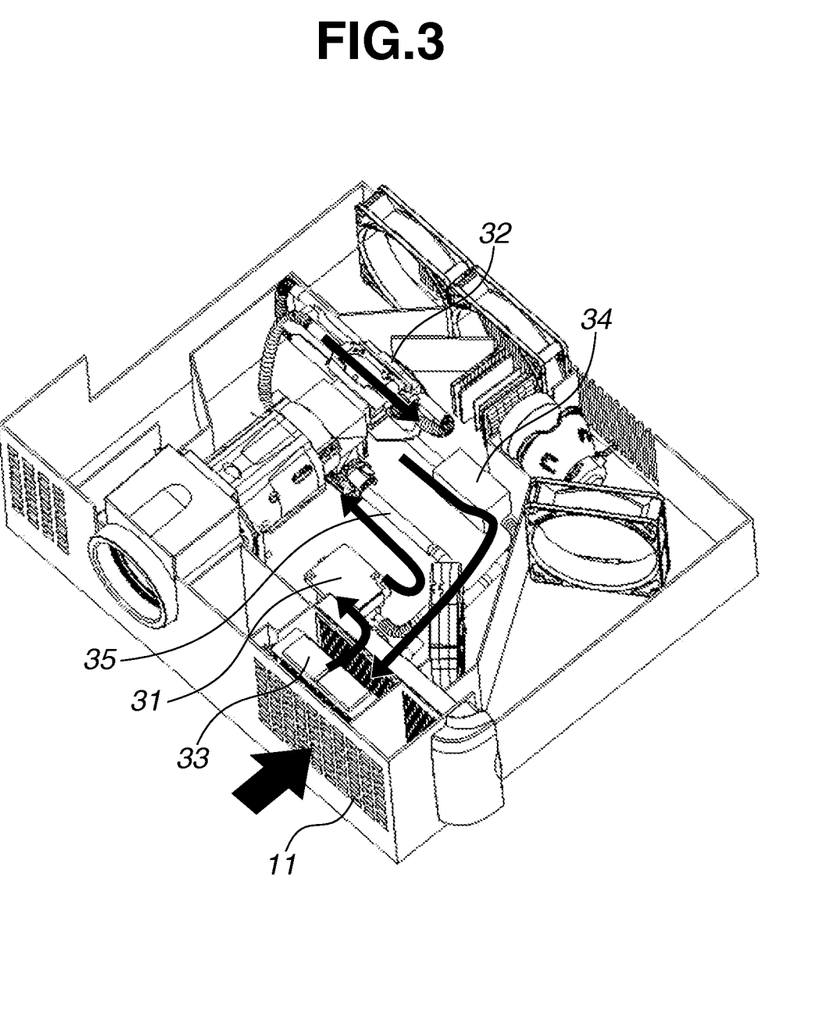
FIG. 3 is a view illustrating a cooling structure of a first cooling unit according to an exemplary embodiment of the present invention.

The optical system 2 is also cooled by air blown from an air blowing fan 4. More specifically, cooling air is taken into the casing 1 through the inlet port 11 formed on the casing 1, and the air blowing fan 4 performs forcible cooling to cool parts of the optical system 2. The cooling air is then discharged through an exhaust port 12 using an exhaust fan 7 for discharging the cooling air in the casing 1. The exhaust fan 7 is a fan for discharging air in the casing 1. Outside air is taken in through the inlet port 11, and after cooling the optical system 2 and heat generating members such as the reflector of the light source 21 and other electrical components, the air is discharged to the outside of the casing 1, whereby the cooling in the casing 1 is achieved.

As described above, air taken in through the inlet port 11 of the apparatus main body is blown to at least one of the members constituting the optical system 2 (a part of the optical system 2), so that not only the light valves 2305 but also the member blown by the air is cooled. In other words, not only a high heat generating section such as the light valve 2305 is locally cooled but also a plurality of cooling targets including a portion around the heat generating section and other optical systems can be efficiently cooled. It is a matter of course that a configuration of blowing air to at least one of the light source 21, the light valves 2305, the first light guide optical system, or the second light guide optical system may be employed.

In the present exemplary embodiment, as illustrated in FIG. 1, an optical axis of the illumination optical system 22 and an optical axis of the projection lens 24 serving as the projection optical system intersect with each other (are orthogonal to each other). The air blowing direction of the air blowing fan 4 is directed from the air blowing fan 4 toward the area between the optical axis of the illumination optical system 22 and the optical axis of the projection lens 24 (the intersection point of the optical axes). In other words, the air blowing fan 4 is disposed so as to guide the air taken in through the inlet port 11, to the illumination optical system 22 and the color separating/combining system 23. In each exemplary embodiment of the present invention, the air blowing fan 4 is a sirocco fan.

3) Dust Removing Structure

In the image display apparatus, a dust collecting filter (dust preventing filter) 5 is disposed at a position on a downstream side of the inlet port 11. The dust collecting filter 5 serves as a filter for removing (collecting) dust when the outside air is taken in through the inlet port 11 (FIGS. 1 and 2) of the casing 1 by the air blowing fan 4 in the casing 1. The dust collecting filter 5 is disposed in a path of air from the inlet port 11 to the member (part) blown by the air blowing fan 4 (the position of the inlet port 11 on the upstream side of the air blowing fan 4 in the air blowing direction in the present exemplary embodiment), and removes dust having a size larger than a first size (not larger than 20 μm). In other words, the dust collecting filter 5 is disposed between the air blowing fan 4 and the radiator 33.

With this arrangement, dust can be prevented from entering the casing 1 when the outside air is taken in. Thus, the optical system 2 is cooled by the air blown from the air blowing fan 4, while the dust having a size larger than the first size being prevented from adhering to the optical system 2.

4) Disposed Position of Radiator

In the present exemplary embodiment, the radiator 33 is disposed between the inlet port 11 and the dust collecting filter 5. With this arrangement, the following effects can be obtained.

As a first effect, large dust such as cotton linters (a particle having a second size that is larger than the first size to be removed by the dust collecting filter 5) is removed by the radiator 33, so that the amount of dust to be collected by the dust collecting filter 5 can be reduced. This can bring about an effect of achieving higher dust collecting efficiency and longer maintenance cycle for filter replacement (longer service life). As described above, the radiator 33 serving as a first filter (coarse filter) is disposed on the upstream side of the dust collecting filter 5 serving as a second filter (fine filter). The inlet port 11, the radiator 33, the dust collecting filter 5, and the air blowing fan 4 are arranged in this order along the path of the air.

As a second effect, the radiator 33 can exchange heat with the outside air without being affected by the heat in the casing 1 and the heat generated in the casing 1. More specifically, by disposing the radiator 33 between the inlet port 11 and the dust collecting filter 5, the cooling efficiency of the liquid cooling unit 3 can be enhanced, so that the light valve 2305 serving as a high heat generating member can be efficiently cooled.

5) Configuration of Cleaning Member

Figure 7:
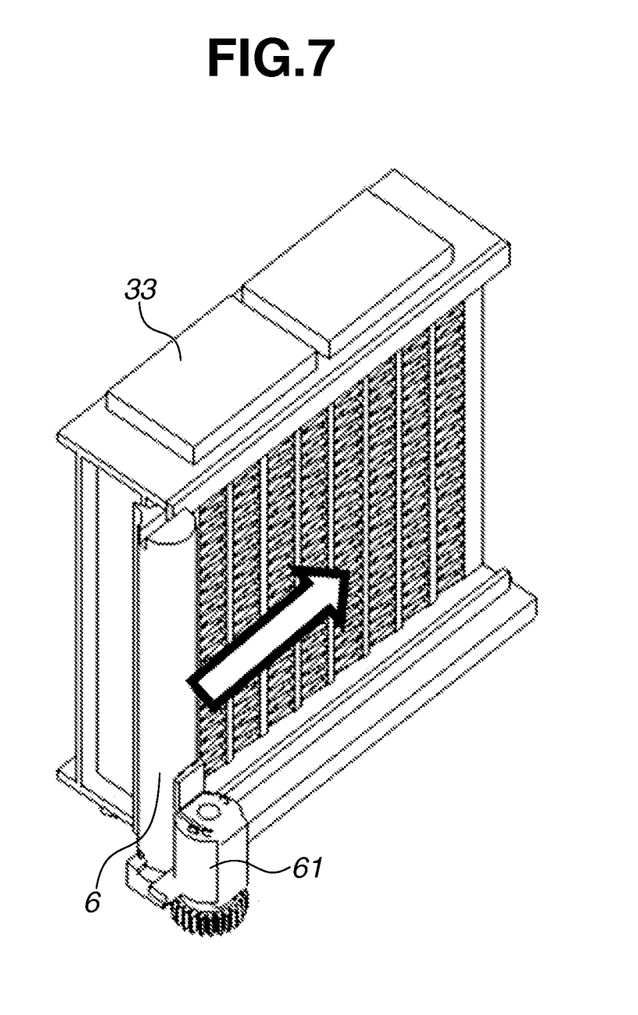
FIG. 7 is an explanatory view illustrating a first cleaning unit according to the first exemplary embodiment.

In the present exemplary embodiment, as illustrated in FIG. 7, a brush 6 serving as a first cleaning member that brushes off the dust is disposed adjacent to the radiator 33. Thus, by cleaning the radiator 33, an effect of preventing the degradation in cooling efficiency that is caused by the dust adhering to the radiator 33 can be obtained in addition to the above-described effects. More specifically, as illustrated in FIG. 7, a motor 61 attached to the brush 6 moves in parallel with a plane orthogonal to the air flowing direction of the radiator 33. The brush 6 is thereby moved in the same direction to brush off the dust adhering to the upstream side (front surface) of the radiator 33.

Figure 8:
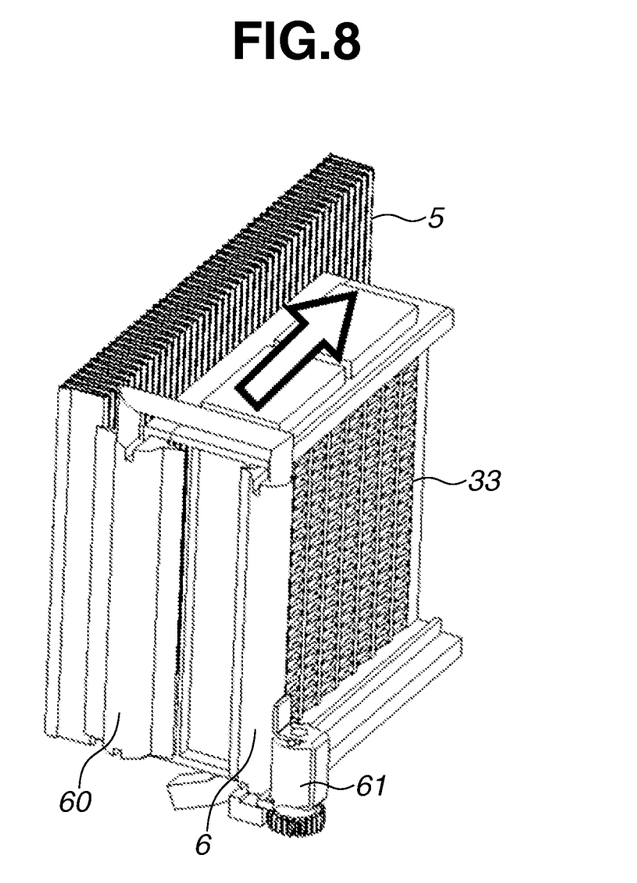
FIG. 8 is an explanatory view illustrating a second cleaning unit according to the first exemplary embodiment.

As illustrated in FIG. 8, a brush 60 serving as a second cleaning member is disposed between the radiator 33 and the dust collecting filter 5, and cleans a downstream side (rear surface) of the radiator 33 and the dust collecting filter 5. In other words, in the present exemplary embodiment, the brush 6 and the brush 60 are integrally formed. Thus, the brush 60 can be operated in the same manner as the brush 6 through the movement of the motor 61.

By disposing the brushes 6 and 60 serving as the cleaning units adjacent to the radiator 330 as described above, the dust on the radiator 330 and on the dust collecting filter 5 can be simultaneously brushed off by integrally driving the brush 6 and the brush 60. This brings about an effect of removing absorbed matters such as oil and tar of cigarette smoke, and an effect of achieving further longer maintenance cycle for replacing the dust collecting filter 5 or even eliminating the need for the maintenance.

Figure 9:
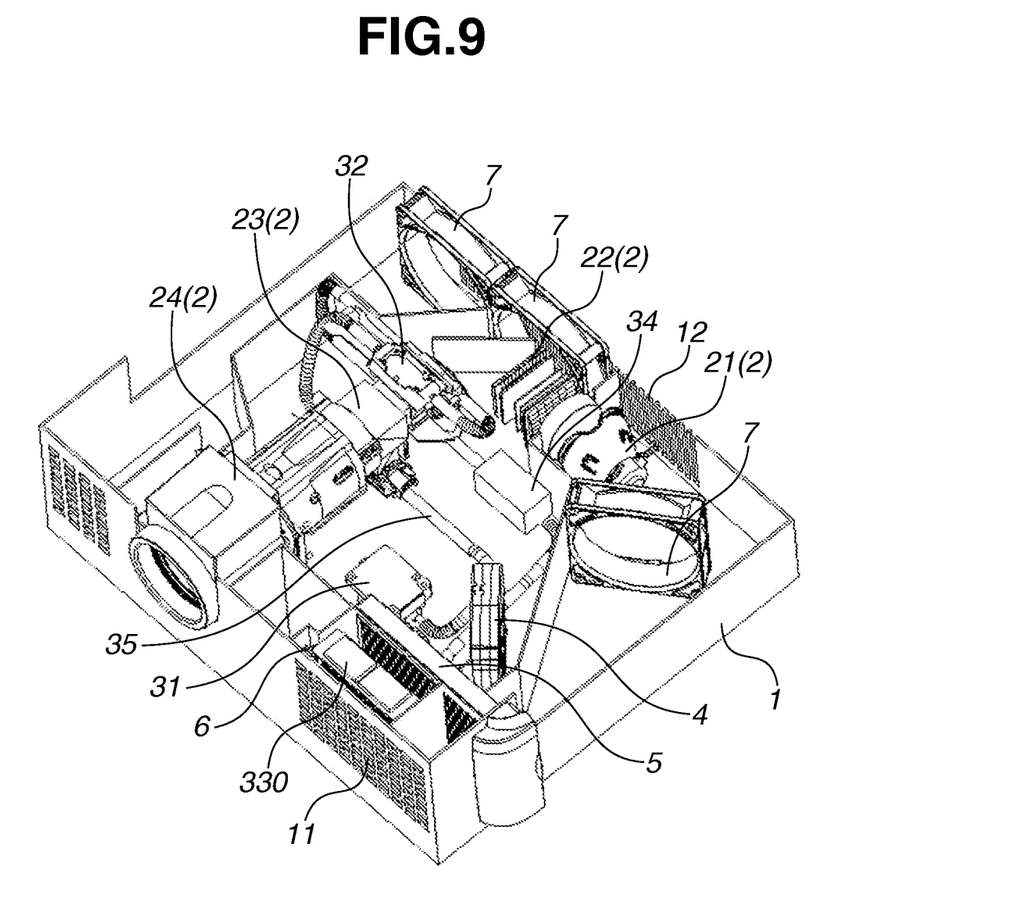
FIG. 9 is an overall configuration view illustrating an image display apparatus according to a second exemplary embodiment of the present invention.

A configuration of a projector serving as an image display apparatus according to a second exemplary embodiment of the present invention that efficiently performs the cooling while preventing the dust adhesion will be described below with reference to FIG. 9. In contrast to the first exemplary embodiment, the present exemplary embodiment is characterized in that a radiator 330 formed of a predetermined material is provided. More specifically, the radiator 330 according to the present exemplary embodiment is formed of an antifouling material obtained through antifouling processing such as fluorine processing and ion vapor deposition. The radiator 330 has an effect of preventing dust adhesion when outside air is taken in.

Figure 10:
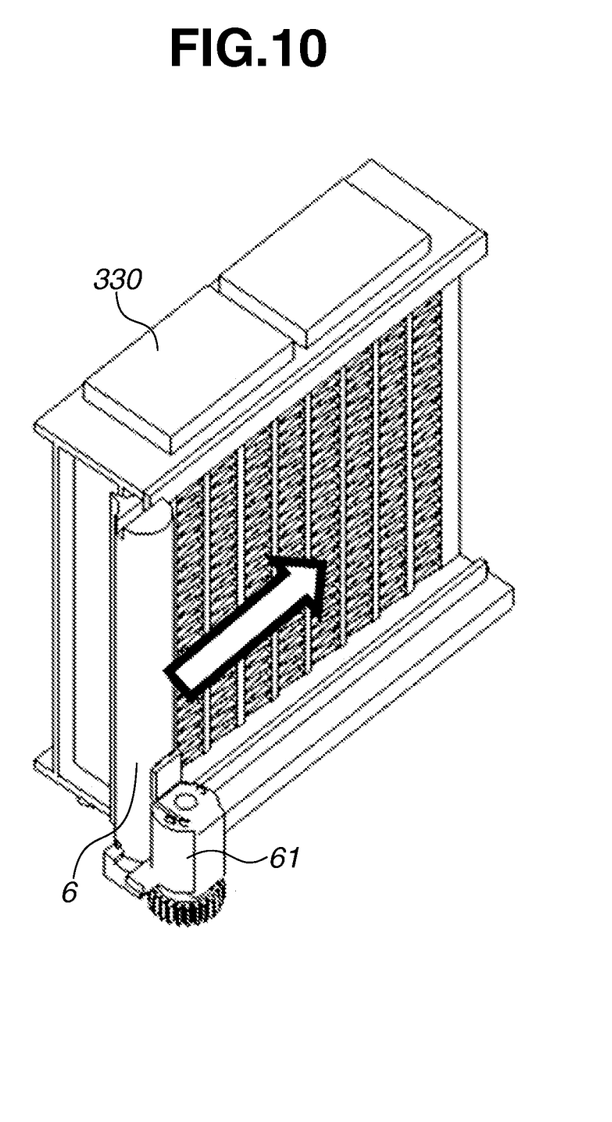
FIG. 10 is an explanatory view illustrating a first cleaning unit according to the second exemplary embodiment.
Figure 11:
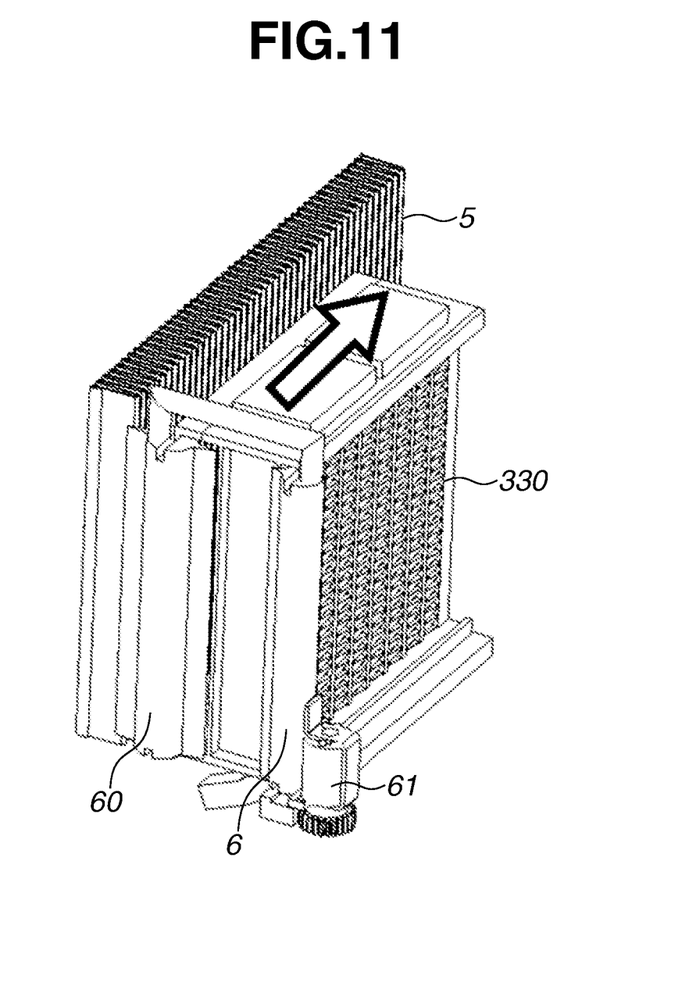
FIG. 11 is an explanatory view illustrating a second cleaning unit according to the second exemplary embodiment.

As illustrated in FIGS. 10 and 11, in the present exemplary embodiment, the brushes 6 and 60 serving as the cleaning units are disposed adjacent to the radiator 330 as in the first exemplary embodiment. By disposing the brushes 6 and 60 serving as the cleaning units adjacent to the radiator 330 as described above, the dust on the radiator 330 and on the dust collecting filter 5 can be simultaneously brushed off by integrally driving the brush 6 and the brush 60. This brings about an effect of removing absorbed matters such as oil and tar of cigarette smoke, and an effect of achieving further longer maintenance cycle for replacing the dust collecting filter 5 or even eliminating the need for the maintenance.

Modifications

The exemplary embodiments of the present invention have been described above, but the present invention is not limited to these exemplary embodiments, and various modifications and change can be made without departing from the gist of the present invention. More specifically, the configurations of the optical system and the liquid cooling system, the number of fans, and cleaning method employed by the cleaning units are not limited to those in the exemplary embodiments, and can be modified and changed in various ways without departing from the gist of the present invention.

Modification 1

While the reflective light valves are used in the exemplary embodiments described above, light valves may be transmissive light valves. When the light valve itself emits light, the light source, the illumination optical system, and the color separating optical system described above are not required.

Modification 2

In the exemplary embodiments described above, the projector that includes the projection lens serving as the projection optical system and performs display on the screen surface has been described as the image display apparatus. However, the present invention is not limited to this, and can be similarly applied to an image display apparatus such as a liquid-crystal television that includes no second light guide optical system and includes a light emitting diode (LED) as the light source. In this case, display is performed on an image display screen to which light beams from light valves are guided through the color combining optical system. On the other hand, when the present invention is applied to an edge type LED backlight with the LEDs arranged along an edge portion of a liquid-crystal television, the LEDs may serve as the light source, the liquid-crystal panel may serve as the light valve, and a light guide plate that guides light beams from the LEDs to the liquid-crystal panel may serve as the first light guide optical system. When the present invention is applied to a direct type LED backlight with the LEDs two-dimensionally arranged on a back surface of a liquid-crystal panel, the LEDs may serve as the light source, the liquid-crystal panel may serve as the light valve, and a diffuser panel between the two-dimensionally arranged LEDs and the liquid-crystal panel may serve as the first light guide optical system.

Modification 3

In the exemplary embodiments described above, the description has been given of the configuration in which the light source is the high-pressure mercury lamp, and the first cooling unit cools the light valve with liquid. However, the configuration is not limited to this, and a configuration in which only a solid-state light source such as a laser diode (hereinafter, referred to as LD) or the solid-state light source and a fluorescent material serve(s) as the light source instead of the high-pressure mercury lamp, and the first cooling unit cools at least one of the LD or the light valve may be employed.

Modification 4

In the exemplary embodiment described above, the description has been given of the configuration in which the first cooling unit cools the light valve with liquid and the second cooling unit cools the illumination optical system and the color separating/combining system with air. However, the present invention is not limited to this. The first and the second cooling units may cool any member of the image display apparatus. For example, a configuration in which the first and the second cooling units cool the projection optical system may be employed. In other words, the first and the second cooling units are only required to cool at least one of the light source, the light valve, the first light guide optical system, or the second light guide optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-233510, filed Nov. 18, 2014 and No. 2015-215040, filed Oct. 30, 2015, which are hereby incorporated by reference herein in their entirety.

What is claimed is:
1. An image display apparatus comprising:
 a light source;
 a light valve;
 at least one light guide optical system of a first light guide optical system configured to guide a light beam from the light source to the light valve or a second light guide optical system configured to guide a light beam from the light valve to a projection surface;
 a pump configured to circulate a coolant inside a tube;

a radiator configured to radiate heat from at least one of the light source, the light valve, the first light guide optical system, or the second light guide optical system through the coolant;

a first cooling unit configured to cool at least one of the light source, the light valve, the first light guide optical system, or the second light guide optical system;

an inlet port;

a second cooling unit including an air blowing fan and configured to cool at least one of the light source, the light valve, the first light guide optical system, or the second light guide optical system using air taken in through the inlet port; and a filter disposed in an air path from the inlet port to a member to be blown by the air blowing fan, wherein the radiator is disposed between the inlet port and the filter.

2. The image display apparatus according to claim 1, further comprising a first cleaning unit disposed between the inlet port and the radiator, and configured to clean the radiator.

3. The image display apparatus according to claim 1, further comprising a second cleaning unit disposed between the radiator and the filter, and configured to clean the radiator and the filter.

4. The image display apparatus according to claim 1, wherein the radiator is formed of an antifouling material.

5. The image display apparatus according to claim 1, wherein the filter is disposed between the air blowing fan and the radiator.

6. The image display apparatus according to claim 1, wherein the first light guide optical system includes an illumination optical system configured to illuminate the light valve with a light beam from the light source, and a color separating optical system configured to guide a light beam from the illumination optical system to the light valve.

7. The image display apparatus according to claim 1, wherein the second light guide optical system includes a projection optical system, and a color combining optical system configured to guide a light beam from the first light guide optical system to the projection optical system.

8. The image display apparatus according to claim 1, wherein the light valve is a reflective liquid-crystal display element.

9. The image display apparatus according to claim 1, wherein the light valve is a transmissive liquid-crystal display element.

10. The image display apparatus according to claim 1, wherein the air blowing fan is disposed at a position where the taken-in air is guidable to at least one of the first light guide optical system or the second light guide optical system.

11. The image display apparatus according to claim 1, wherein the light source is a solid-state light source.

* * * * *